United States Patent
Takeda (10) Patent No.: US 12,539,623 B2
(45) Date of Patent: Feb. 3, 2026

(54) JOINT MECHANISM

(71) Applicant: TOYOTA JIDOSHA KABUSHIKI KAISHA, Toyota (JP)

(72) Inventor: Takahiro Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/940,194

(22) Filed: Nov. 7, 2024

(65) Prior Publication Data

US 2025/0162178 A1   May 22, 2025

(30) Foreign Application Priority Data

Nov. 16, 2023 (JP) ................................. 2023-194967

(51) Int. Cl.
*B25J 17/00* (2006.01)
*B25J 17/02* (2006.01)

(52) U.S. Cl.
CPC .................... *B25J 17/0275* (2013.01)

(58) Field of Classification Search
CPC ........ B25J 17/0275; B25J 17/02; B25J 1/025; B25J 17/0283; B25J 17/0291; B25J 17/0258
See application file for complete search history.

(56) References Cited

U.S. PATENT DOCUMENTS

| 8,343,141 B2* | 1/2013 | Madhani | A61B 34/71 606/1 |
| 8,601,899 B2* | 12/2013 | Raju | B25J 9/046 74/490.06 |
| 8,761,927 B2* | 6/2014 | Johnson | B25J 17/0266 901/23 |
| 2003/0101838 A1* | 6/2003 | Shinozaki | B25J 15/0009 74/490.05 |
| 2017/0021507 A1* | 1/2017 | Jackson | B25J 17/0275 |
| 2020/0147783 A1* | 5/2020 | Crawford | B25J 9/102 |

FOREIGN PATENT DOCUMENTS

JP   2003-170381 A   6/2003

* cited by examiner

*Primary Examiner* — Zakaria Elahmadi
(74) *Attorney, Agent, or Firm* — Oliff PLC (57) ABSTRACT

A joint mechanism includes: a rotatable first rotary shaft arranged on a proximal side; a rotatable second rotary shaft arranged on a distal side; and a joint part coupling the first and second rotary shafts with first and second coupling members and transmitting rotation from the first rotary shaft to the second rotary shaft, rotating around a pitch axis, a yaw axis, and a roll axis perpendicular to one another. The first and second coupling members are relatively rotatably coupled in series. One of the first and second rotary shafts is configured to be extendable and contractible with a telescopic mechanism. The first and second coupling members are arranged such that an intersection of a center axis line of the first rotary shaft and a center axis line of the second rotary shaft coincides with an intersection of the pitch axis, the yaw axis, and the roll axis.

9 Claims, 7 Drawing Sheets

JOINT MECHANISM

CROSS-REFERENCE TO RELATED APPLICATION

This application claims priority to Japanese Patent Application No. 2023-194967 filed on Nov. 16, 2023, incorporated herein by reference in its entirety.

BACKGROUND

1. Technical Field

The present disclosure relates to a joint mechanism for a robot or the like.

2. Description of Related Art

There is known a joint mechanism including: a first rotary shaft that is arranged on a proximal side and rotated by drive means; a rotatable second rotary shaft arranged on a distal side; and a joint part that couples the first and second rotary shafts with a coupling member such as a universal joint and transmits rotation from the first rotary shaft to the second rotary shaft while rotating around a pitch axis, a yaw axis, and a roll axis perpendicular to one another (for example, refer to Japanese Unexamined Patent Application Publication No. 2003-170381).

SUMMARY

While with the joint mechanism above, the rotary shafts for the joint part have a three-axis perpendicular configuration and excellent controllability, there however arises a problem of a narrow bending range since the joint part bends with one coupling member.

The present disclosure has been devised in order to solve such a problem, and a main object thereof is to provide a joint mechanism capable of widening a bending range of a joint part while making controllability of the joint part excellent.

An aspect of the present disclosure in order to achieve the object is a joint mechanism including:
a rotatable first rotary shaft arranged on a proximal side;
a rotatable second rotary shaft arranged on a distal side; and
a joint part that couples the first and second rotary shafts with first and second coupling members and transmits rotation from the first rotary shaft to the second rotary shaft while the first rotary shaft and the second rotary shaft rotating around a pitch axis, a yaw axis, and a roll axis perpendicular to one another, wherein:
the first and second coupling members are relatively rotatably coupled in series;
one of the first rotary shaft and the second rotary shaft is configured so as to be extendable and contractible with a telescopic mechanism; and
the first and second coupling members are arranged such that an intersection of a center axis line of the first rotary shaft and a center axis line of the second rotary shaft coincides with an intersection of the pitch axis, the yaw axis, and the roll axis.

In this aspect,
the second rotary shaft may have an offset shaft having an offset of a predetermined angle in a bending direction of the joint part relative to a center axis line of the second coupling member.

A center axis of the offset shaft may go through a bending center of the first and second coupling members.

In this aspect,
the first and second coupling members may be arranged such that, when each of the first and second coupling members takes any bending angle within a movable range, the intersection of the center axis line of the first rotary shaft and the center axis line of the second rotary shaft coincides with the intersection of the pitch axis, the yaw axis, and the roll axis.

In this aspect,
the first rotary shaft may be configured so as to be extendable and contractible with the telescopic mechanism.

In this aspect,
the second rotary shaft may have
a rotary shaft having a rear end coupled to the second coupling member,
a first bevel gear coupled to a distal end of the rotary shaft,
a second bevel gear that engages with the first bevel gear and transmits motive power to the offset shaft,
a holding member that rotatably holds the first and second bevel gears, and
the offset shaft that is rotatably held by the holding member.

In this aspect,
the first and second coupling members may be first and second universal joints.

In this aspect,
the joint part may be a wrist joint part, and
the predetermined angle may be 10 deg.

According to the present disclosure, there can be provided the joint mechanism capable of widening a bending range of the joint part while making controllability of the joint part excellent.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment 1

Hereafter, the present disclosure will be described with embodiments of the disclosure, and the disclosure according to the claims is not limited to the following embodiments. Moreover, all of the configurations described with the embodiments are not necessarily essential for means for solving the problem.

Figure 1:
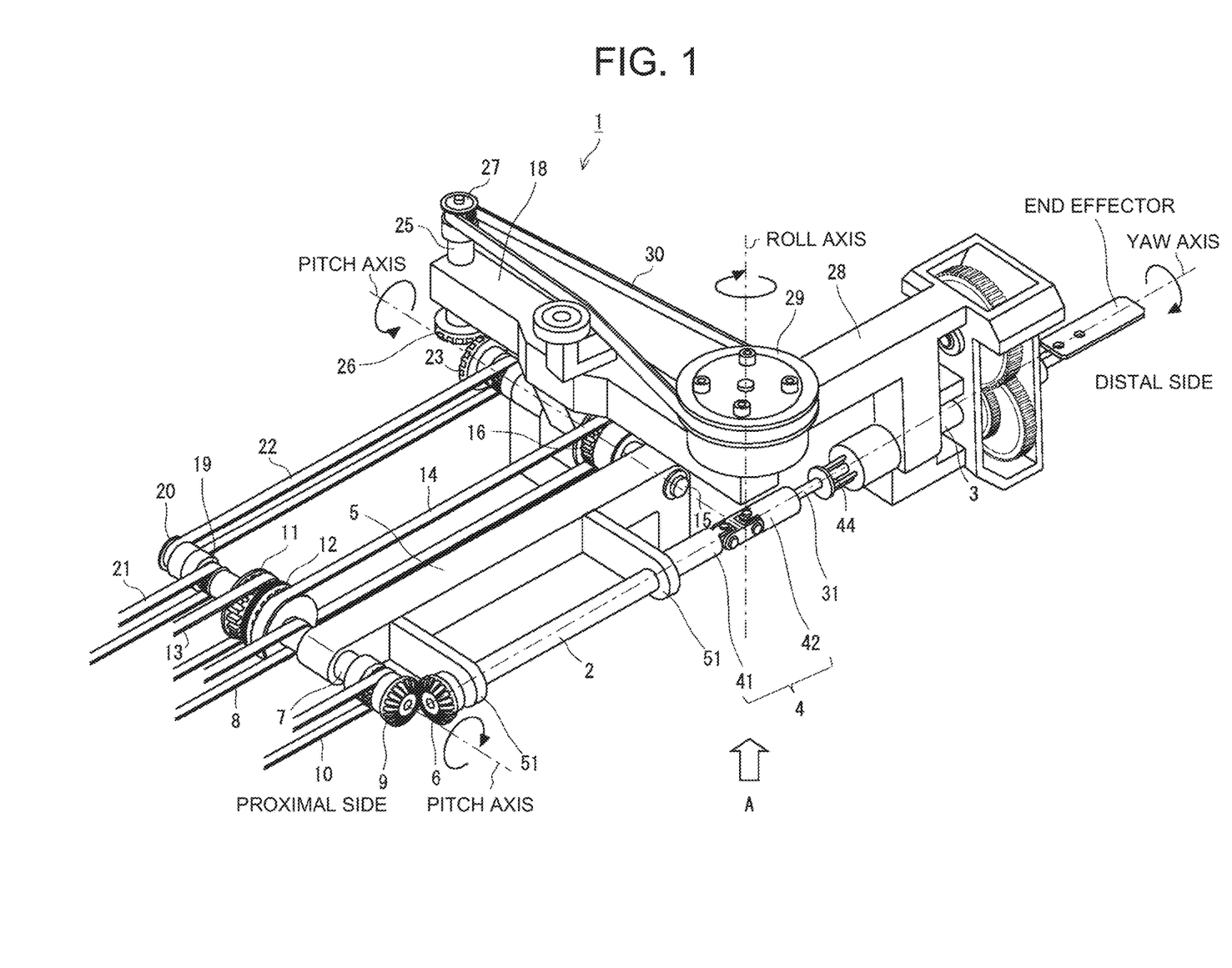
FIG. 1 is a view showing a schematic configuration of a manipulator according to the present embodiment.
Figure 2:
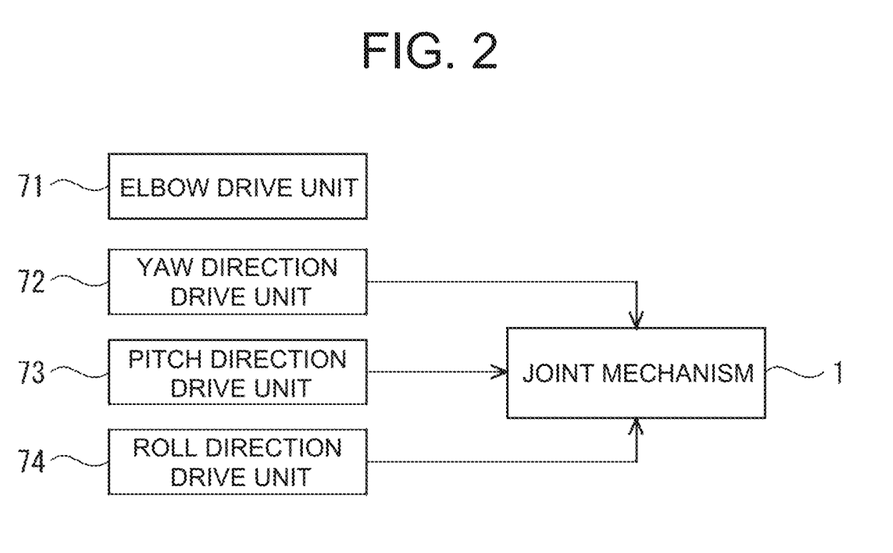
FIG. 2 is a block diagram showing a schematic system configuration of the manipulator according to the present embodiment.

FIG. 1 is a view showing a schematic configuration of a manipulator according to the present embodiment. FIG. 2 is a block diagram showing a schematic system configuration of the manipulator according to the present embodiment. A joint mechanism 1 according to the present embodiment is configured as a joint for the manipulator which manipulates an object or the like. Notably, the joint mechanism 1 shown in FIG. 1 has a structure supposed to be a left hand of a robot, and a right hand thereof is also configured as with the left hand.

The joint mechanism 1 according to the present embodiment includes a first rotary shaft 2 arranged on a proximal side, a second rotary shaft 3 arranged on a distal side, and a wrist joint part 4 that transmits a rotational force from the first rotary shaft 2 to the second rotary shaft 3 while rotating the first and second rotary shafts 2, 3 around a pitch axis, a yaw axis, and a roll axis. The wrist joint part 4 is a specific example of a joint part.

The first rotary shaft 2 is rotatably axially supported by a first support member 5. A bevel gear 6 is attached to a proximal-side end of the first rotary shaft 2. A pair of holding parts 51 are provided on the first support member 5. The holding parts 51 axially support the first rotary shaft 2 via bearings and the like.

An elbow rotary shaft 7 is attached and fixed to a proximal-side end of the first support member 5. The elbow rotary shaft 7 works as a rotary shaft of an elbow joint of the manipulator. A belt 8 is put on the elbow rotary shaft 7. The belt 8 is rotationally driven by an elbow drive unit 71. The elbow drive unit 71 is constituted of an actuator such as a motor. When the belt 8 is rotated by the elbow drive unit 71, the elbow rotary shaft 7 rotates in the pitch direction, and the first support member 5 also rotates in the pitch direction.

A bevel gear 9 is rotatably attached to one end of the elbow rotary shaft 7. A belt 10 is put on a base of the bevel gear 9 of the elbow rotary shaft 7. The belt 10 is rotationally driven by a yaw direction drive unit 72. The yaw direction drive unit 72 is constituted of an actuator such as a motor. The bevel gear 9 of the elbow rotary shaft 7 engages with the bevel gear 6 of the first rotary shaft 2.

Thereby, when the belt 10 is rotated by the yaw direction drive unit 72 to rotate the bevel gear 9 of the elbow rotary shaft 7 in the pitch direction, the bevel gear 6 engaging with the bevel gear 9 rotates in the yaw direction, and the first rotary shaft 2 also rotates in the yaw direction.

A pair of gears 11, 12 are rotatably attached to the elbow rotary shaft 7. The pair of gears 11, 12 are coupled and integrally rotate. The pair of gears 11, 12 rotates around the elbow rotary shaft 7.

A belt 13 is put on one of those, the gear 11. The belt 13 is rotationally driven by a pitch direction drive unit 73. The pitch direction drive unit 73 is constituted of an actuator such as a motor. One end of a belt 14 is put on the other of those, the gear 12. The other end of the belt 14 is put on a gear 16 fixed to a wrist rotary shaft 15. Notably, a belt tensioner for adjusting tension of the belt 14 may be provided on the belt 14.

The wrist rotary shaft 15 is axially supported on the first support member 5 via bearings and the like so as to be rotatable in the pitch direction. A second support part 18 is coupled to the wrist rotary shaft 15. Thereby, when the belt 13 is rotated by the pitch direction drive unit 73 to rotate the pair of gears 11, 12 in the pitch direction, the belt 14 rotates, and the wrist rotary shaft 15 and the second support part 18 rotate in the pitch direction.

A pair of gears 19, 20 are rotatably attached to the elbow rotary shaft 7. The pair of gears 19, 20 are coupled and integrally rotate. The pair of gears 19, 20 rotate around the elbow rotary shaft 7. A belt 21 is put on one of those, the gear 19. The belt 21 is rotationally driven by a roll direction drive unit 74. The roll direction drive unit 74 is constituted of an actuator such as a motor.

One end of a belt 22 is put on the other of those, the gear 20. The other end of the belt 22 is put on a base of a bevel gear 23 fixed to the wrist rotary shaft 15. Notably, a belt tensioner for adjusting tension of the belt 22 may be provided on the belt 22.

A rotary shaft 25 is rotatably axially supported on one end of the second support part 18 via bearings and the like. A bevel gear 26 is coupled to a lower end of the rotary shaft 25. The bevel gear 26 of the rotary shaft 25 engages with the bevel gear 23 of the wrist rotary shaft 15. A gear 27 is coupled to an upper end of the rotary shaft 25.

To the other end of the second support part 18, one end of a third support part 28 is coupled rotatably in the roll direction. A gear 29 is attached and fixed to the one end of the third support part 28. A belt 30 is put on the gear 27 of the rotary shaft 25 and the gear 29 of the third support part 28. Notably, a belt tensioner for adjusting tension of the belt 30 may be provided on the belt 30.

Thereby, when the belt 21 is rotated by the roll direction drive unit 74 to rotate the pair of gears 19, 20 in the pitch direction, the belt 22 rotates and the bevel gear 23 of the wrist rotary shaft 15 rotates in the pitch direction. Then, the bevel gear 26 and the gear 27 of the rotary shaft 25 rotate, and via the belt 30, the gear 29 of the third support part 28 rotates in the roll direction.

The third support part 28 rotatably axially supports the second rotary shaft 3 via bearings and the like. For example, an end effector or the like for holding an object or the like is provided at the distal end of the second rotary shaft 3 on the distal side.

The wrist joint part 4 has first and second universal joints 41, 42. The first and second universal joints 41, 42 are relatively rotatably coupled in series. The first and second universal joints 41, 42 couple the first and second rotary shafts 2, 3, and thereby, transmit a rotational force from the first rotary shaft 2 to the second rotary shaft 3 while bending.

Notably, in the present embodiment, the first and second universal joints 41, 42 are regarded as a specific example of first and second coupling members. Nevertheless, the first and second coupling members are not limited to those and, for example, may be other relatively rotatable coupling members such as first and second rubber joints.

The joint mechanism 1 is configured as mentioned above, the pitch direction drive unit 73 drives the belt 13 and the wrist rotary shaft 15 rotates in the pitch direction, and thereby, the first and second universal joints 41, 42 of the wrist joint part 4 bend in the pitch direction. The roll direction drive unit 74 drives the belt 21 and the gear 29 of the third support part 28 rotates in the roll direction, and thereby, the first and second universal joints 41, 42 of the wrist joint part 4 bend in the roll direction. The yaw direction drive unit 72 drives the belt 10 and the first rotary shaft 2 rotates in the yaw direction, and thereby, the first and second universal joints 41, 42 of the wrist joint part 4 rotate in the yaw direction.

As mentioned above, the joint mechanism 1 according to the present embodiment has a configuration in which the roll axis and the pitch axis of the wrist joint part 4 are driven with a serial link mechanism or a parallel link mechanism and the yaw axis of the wrist joint part 4 is driven with universal joints.

Now, in order to reduce inertia of the manipulator, as mentioned above, the actuators are arranged at the base of the manipulator, and the torques thereof are transmitted to the distal side using the transmission mechanism. In this case, since the wrist joint part 4 has high degrees of freedom (three degrees of freedom) and has a separate distance from the base, this leads to high technical difficulty, and furthermore, the following problems arise.

(1) The three pitch axis, yaw axis, and roll axis which realize the rotations of the wrist joint part 4 with the three degrees of freedom may be perpendicular to one another, which can facilitate calculation of inverse kinematics and can make controllability of the wrist joint part 4 excellent.

(2) For example, joint bending ranges of a wrist joint part of a person are approximately −90 deg (flexion) to +70 deg (expansion) in the roll direction, −55 deg (ulnar flexion) to +25 deg (radial flexion) in the pitch direction, and −90 deg (supination) to +90 deg (pronation) in the yaw direction, and also with the wrist joint part 4 for a robot, equivalent bending ranges are expected.

In consideration of these, as shown in FIG. 1, the joint mechanism 1 according to the present embodiment includes: the rotatable first rotary shaft 2 arranged on the proximal side; the rotatable second rotary shaft 3 arranged on the distal side; and the wrist joint part 4 that couples the first and second rotary shafts 2, 3 with the first and second universal joints 41, 42 coupled in series and transmits rotation from the first rotary shaft 2 to the second rotary shaft 3 while the first rotary shaft 2 and the second rotary shaft 3 rotating around the pitch axis, the yaw axis, and the roll axis perpendicular to one another. The second rotary shaft 3 is configured so as to be extendable and contractible with a telescopic mechanism 44. The first and second universal joints 41, 42 are arranged such that an intersection of a center axis line of the first rotary shaft 2 and a center axis line of the second rotary shaft 3 coincides with an intersection of the pitch axis, the yaw axis, and the roll axis.

As mentioned above, by forming the wrist joint part 4 of the first and second universal joints 41, 42 coupled in series, the bending ranges of the wrist joint part 4 can be widened. With the first and second universal joints 41, 42, the bending ranges of the wrist joint part 4 can be widened, for example, up to −90 deg to +90 deg around the roll axis and −90 deg to +90 deg around the pitch axis.

Meanwhile, in general, in the case where a wrist joint part is constituted of two or more universal joints, when the roll angle and the pitch angle of the wrist joint part change, the bending center point of the wrist joint part also changes, and cannot be kept unchanged.

Against this, in the joint mechanism 1 according to the present embodiment, as mentioned above, the second rotary shaft 3 is configured so as to be extendable and contractible with the telescopic mechanism 44, and the first and second universal joints 41, 42 are arranged such that the intersection of the center axis line of the first rotary shaft 2 and the center axis line of the second rotary shaft 3 coincides with the intersection of the pitch axis, the yaw axis, and the roll axis at all times. In this case, the first and second universal joints 41, 42 are arranged such that, when each of the first and second universal joints 41, 42 takes any bending angle within a movable range (for example, the maximum bending angle of 90 deg), the intersection of the center axis line of the first rotary shaft 2 and the center axis line of the second rotary shaft 3 coincides with the intersection of the pitch axis, the yaw axis, and the roll axis.

Thereby, even when the roll angle and the pitch angle of the wrist joint part 4 change, the second rotary shaft 3 passively extends and contracts with the telescopic mechanism 44 in accordance with the angle changes, and the bending center of the wrist joint part 4 can be kept unchanged. Accordingly, the pitch axis, the yaw axis, and the roll axis of the wrist joint part 4 can be caused to be perpendicular to one another at all times, and controllability of the wrist joint part 4 can be made excellent. Namely, the bending ranges of the wrist joint part 4 can be widened while making controllability of the wrist joint part 4 excellent.

In the present embodiment, the second rotary shaft 3 on the distal end is configured so as to be extendable and contractible with the telescopic mechanism 44, not being limited to this. In place of the second rotary shaft 3 on the distal side, the first rotary shaft 2 on the proximal side may be configured so as to be extendable and contractible with the telescopic mechanism 44. Notably, in order to reduce the inertia of the manipulator, the first rotary shaft 2 on the proximal side may be configured so as to be extendable and contractible with the telescopic mechanism 44.

Figure 3A:
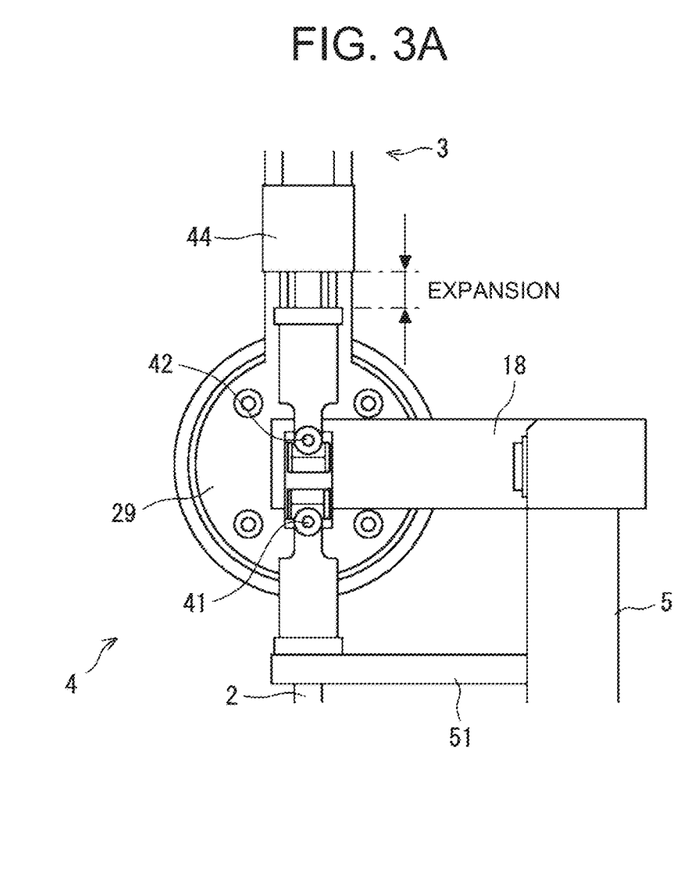
FIG. 3A is a view of a wrist joint part shown in FIG. 1 as viewed in the A-direction.
Figure 3B:
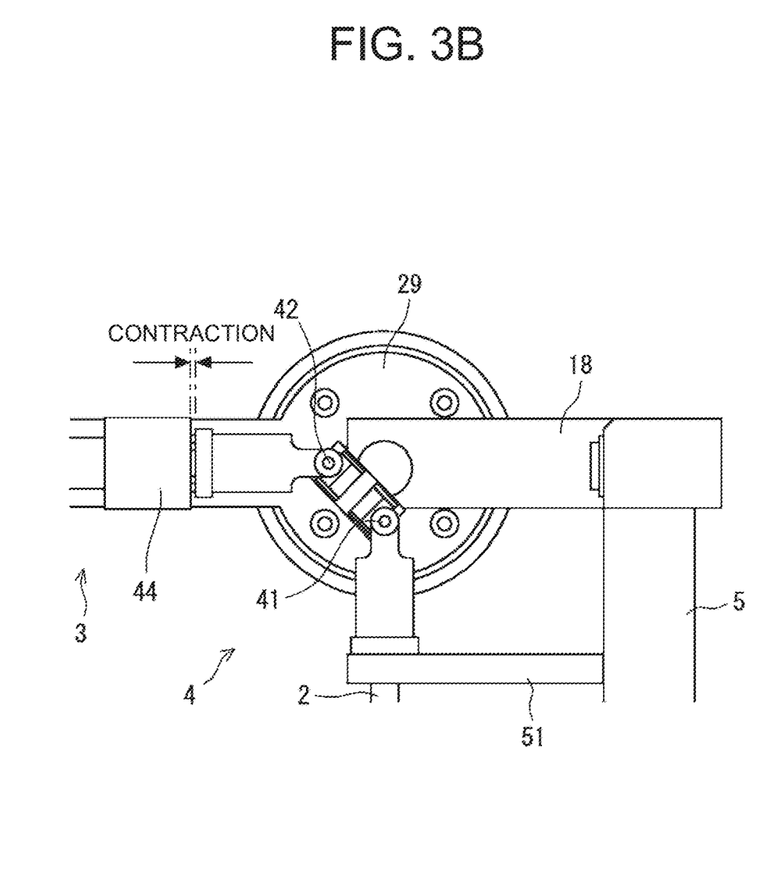
FIG. 3B is a view of the wrist joint part shown in FIG. 1 as viewed in the A-direction.

FIG. 3A and FIG. 3B are views of the wrist joint part shown in FIG. 1 as viewed in the A-direction (from the bottom), being views showing a state of the wrist joint part bending around the roll axis. FIG. 3A is a view showing a state of the bending angle of 0 deg. FIG. 3B is a view showing a state of the bending angle of 90 deg. Notably, FIG. 3A and FIG. 3B show an example in which the second rotary shaft 3 is configured so as to be extendable and contractible with the telescopic mechanism 44.

As shown in FIG. 3A, the telescopic mechanism 44 of the second rotary shaft 3 takes an expansion state at the bending angle of 0 deg of the wrist joint part 4. On the other hand, when the wrist joint part 4 bends from the state of the bending angle of 0 deg shown in FIG. 3A and takes the state of the bending angle of 90 deg shown in FIG. 3B, the telescopic mechanism 44 of the second rotary shaft 3 takes a contraction state.

For example, the telescopic mechanism 44 may be constituted of a piston or the like that transmits the rotation torque while sliding in the axial direction of the second rotary shaft 3, and thereby, extending and contracting in the axial direction. The telescopic mechanism 44 is constituted of a pair of pistons, for example, as shown in FIG. 3A and FIG. 3B, not being limited to this, and may be constituted of any number of pistons or may be constituted of a set of a key and a key hole (key groove).

As above, the joint mechanism 1 according to the present embodiment includes: the rotatable first rotary shaft 2 arranged on the proximal side; the rotatable second rotary shaft 3 arranged on the distal side; and the wrist joint part 4 that couples the first and second rotary shafts 2, 3 with the first and second universal joints 41, 42 coupled in series and transmits the rotation from the first rotary shaft 2 to the second rotary shaft 3 while the first rotary shaft 2 and the second rotary shaft 3 rotating around the pitch axis, the yaw axis, and the roll axis perpendicular to one another. One of the first rotary shaft 2 and the second rotary shaft 3 is configured so as to be extendable and contractible with the telescopic mechanism 44. The first and second universal joints 41, 42 are arranged such that the intersection of the center axis line of the first rotary shaft 2 and the center axis line of the second rotary shaft 3 coincides with the intersection of the pitch axis, the yaw axis, and the roll axis.

Thereby, the bending ranges of the wrist joint part 4 can be widened while making controllability of the wrist joint part 4 excellent.

Embodiment 2

At a wrist joint of a person, the movable range with respect to flexion/expansion (around the roll axis) is +90 deg to +70 deg, the movable range with respect to radial flexion/ulnar flexion (around the pitch axis) is −55 deg to +25 deg, and the movable range with respect to supination/pronation (around the yaw axis) is −90 deg to +90 deg.

On the other hand, at the wrist joint part 4 according to the embodiment above, the movable range around the roll axis is −90 deg to +90 deg, the movable range around the pitch axis is −90 deg to +90 deg, and the movable range around the yaw axis is not restricted.

Among those, for the wrist joint part 4 according to the embodiment above, the movable range around the roll axis being −90 deg to +90 deg causes a less margin as compared with the movable range of −90 deg to +70 deg for the wrist joint of a person.

Here, since when a joint mechanism is designed in reality, it is needed to consider deviations on tolerances of components and their assembly, design margins for the movable ranges of the wrist joint part 4 are needed. If these design margins cannot be secured, when the wrist joint part 4 is operated, for example, up to about −90 deg which is the lower limit of the movable range around the roll axis, there is a possibility of exceeding allowable angles of the first and second universal joints 41, 42, and there arises a risk of breakage.

Accordingly, when the movable ranges of the wrist joint part 4 can be designed in consideration of the design margins, exceeding the allowable angles of the first and second universal joints 41, 42 does not happen, and the risk of breakage can be largely reduced. For example, when the movable range of the wrist joint part 4 can be designed as −100 deg to +80 deg, a margin of 10 deg can be secured.

Figure 4:
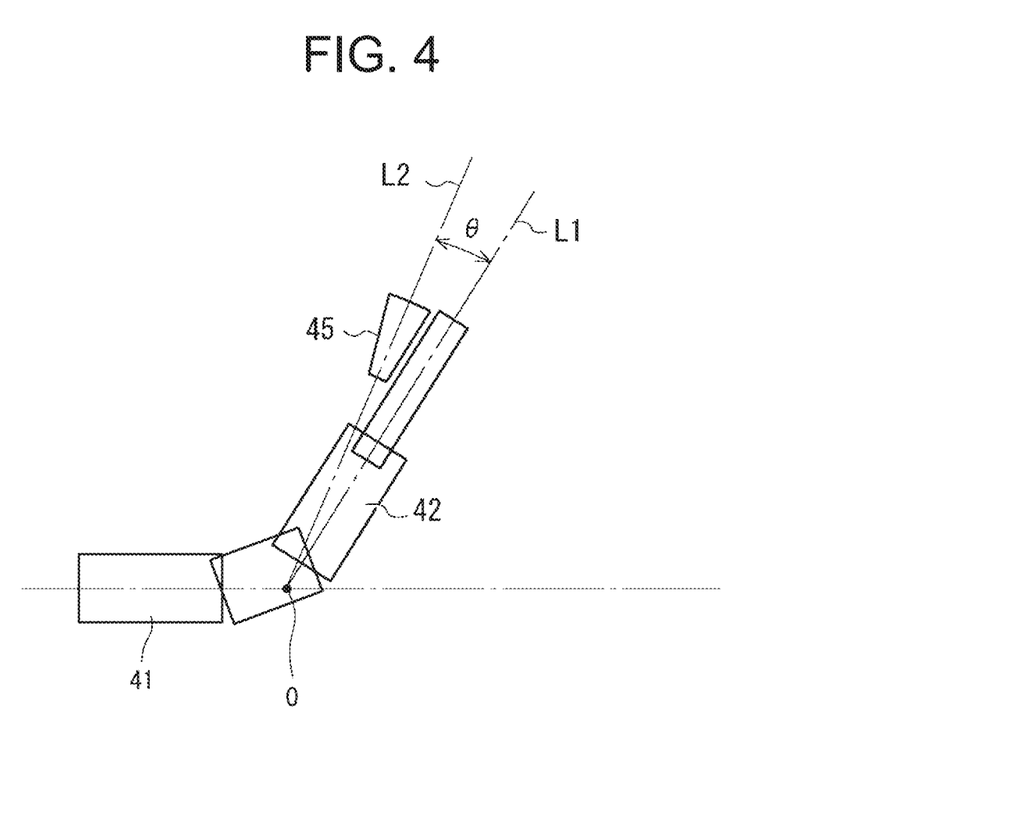
FIG. 4 is a view of an offset shaft having an offset of a predetermined angle θ in a bending direction of the wrist joint part relative to a center axis line of a second universal joint.

In consideration of this, as shown in FIG. 4, the second rotary shaft 3 according to the present embodiment has an offset shaft 45 that has an offset of a predetermined angle θ in the bending direction of the wrist joint part 4 relative to a center axis L1 of the second universal joint 42. A center axis L2 of the offset shaft 45 goes through a bending center O of the first and second universal joints 41, 42. Thereby, the movable ranges of the wrist joint part 4 can be designed in consideration of the design margins above.

Figure 5:
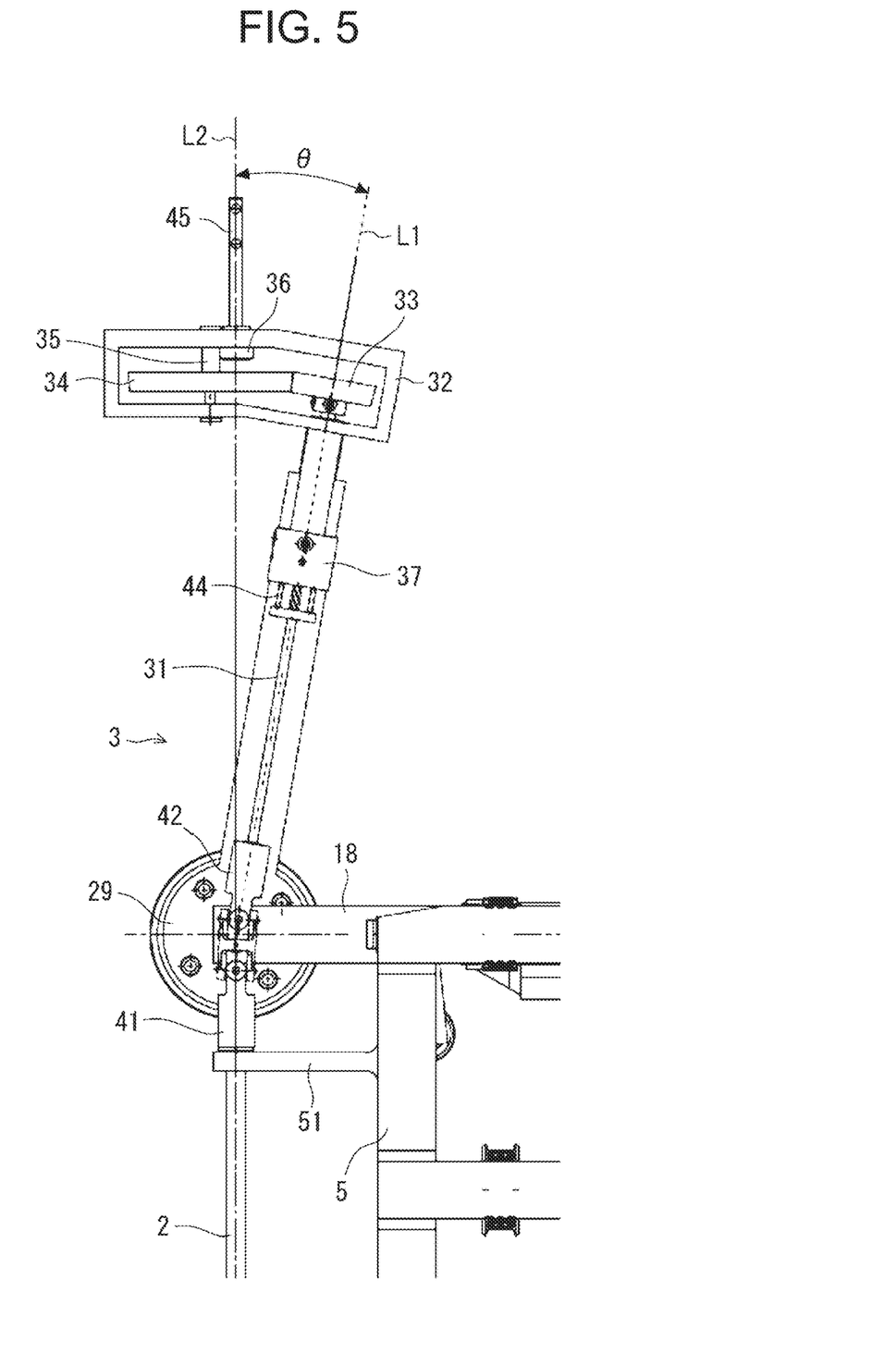
FIG. 5 is a view showing a specific example of the offset shaft according to the present embodiment.

FIG. 5 is a view showing a specific example of an offset shaft according to the present embodiment. As shown in FIG. 5, the second rotary shaft 3 has a rotary shaft 31, a holding member 32, a first bevel gear 33, a second bevel gear 34, a first spur gear 35, a second spur gear 36, a case member 37, the telescopic mechanism 44, and the offset shaft 45.

The rotary shaft 31 rotates in the tubular case member 37. The second universal joint 42 is coupled to a rear end of the rotary shaft 31. The center axis L1 of the rotary shaft 31 and the center axis of the second universal joint 42 are on the same line. The telescopic mechanism 44 mentioned above is provided on the distal side of the rotary shaft 31 and causes the rotary shaft 31 to extend and contract. The holding member 32 is attached to a distal end of the case member 37.

The holding member 32 rotatably holds the first and second bevel gears 33, 34 and the first and second spur gears 35, 36 inside. In the holding member 32, the first bevel gear 33 is coupled to a distal end of the rotary shaft 31. In the holding member 32, the first bevel gear 33 is rotatably provided. The first bevel gear 33 and the second bevel gear 34 engage with each other in the holding member 32. The second bevel gear 34 and the first spur gear 35 are coaxially coupled and integrally rotate.

The offset shaft 45 is rotatably provided on the holding member 32 via a bearing and the like. The second spur gear 36 is coaxially coupled to a rear end of the offset shaft 45 in the holding member 32. Notably, as mentioned above, while the offset shaft 45 and the second spur gear 36 are coaxially coupled, not being limited to this, a spur gear may be provided between the offset shaft 45 and the second spur gear 36. The first spur gear 35 and the second spur gear 36 engage with each other in the holding member 32. An end effector or the like is provided at the distal end of the offset shaft 45.

The holding member 32 bends such that the center axis line L2 of the offset shaft 45 has an offset of the predetermined angle θ relative to the center axis line L1 of the rotary shaft 31 (second universal joint 42).

With the configuration above, when the first and second universal joints 41, 42 and the rotary shaft 31 rotate around the yaw axis, the first bevel gear 33 rotates. Then, the second bevel gear 34 rotates, the first and second spur gears 35, 36 rotate, and the offset shaft 45 rotates around the yaw axis.

Meanwhile, when the second universal joint 42 rotates around the roll axis and around the pitch axis, the offset shaft 45 also integrally rotates around the roll axis and around the pitch axis. Notably, as shown in FIG. 5, the first bevel gear 33 and the offset shaft 45 are configured so as to be able to rotate in the same direction, not being limited to this. For example, when the first bevel gear 33 and the offset shaft 45 may rotate in the reverse directions, there may be employed a configuration in which the second bevel gear 34 is arranged on the same straight line as the center axis L2 of the offset shaft 45 and the offset shaft 45 is attached to the second bevel gear 34. Thereby, the first and second spur gears 35, 36 can be omitted, and the number of components can be reduced.

Moreover, as shown in FIG. 5, the holding member 32 is configured to be in a box shape, not being limited to this. For example, since when the first and second spur gears 35, 36 are omitted as mentioned above, the offset shaft 45 is attached to the second bevel gear 34, the holding member 32 is not needed to be in a box shape and may be in a plate shape.

Figure 6A:
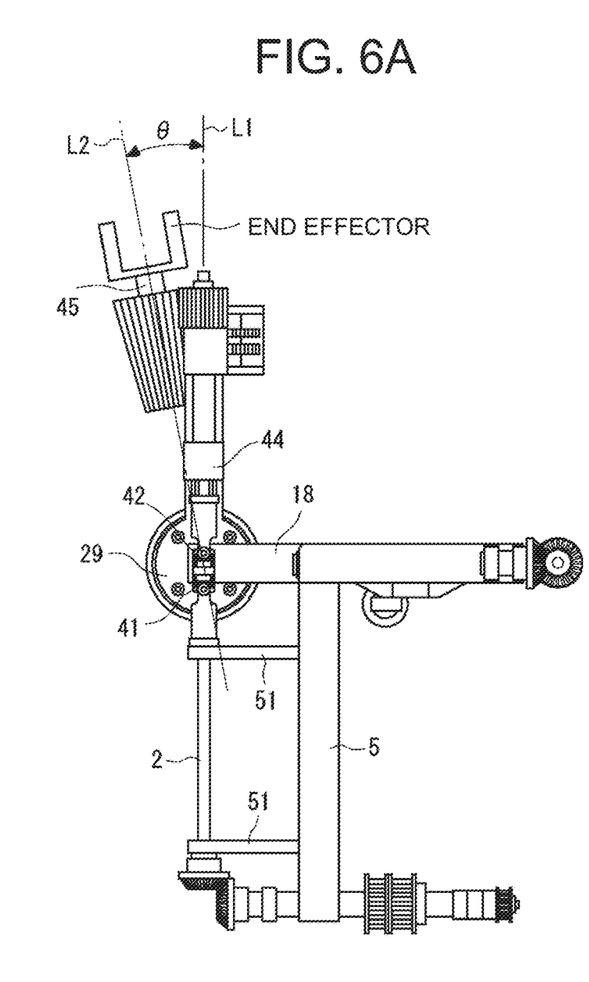
FIG. 6A shows a view showing a state where the wrist joint part according to the present embodiment is bending around the roll axis.
Figure 6B:
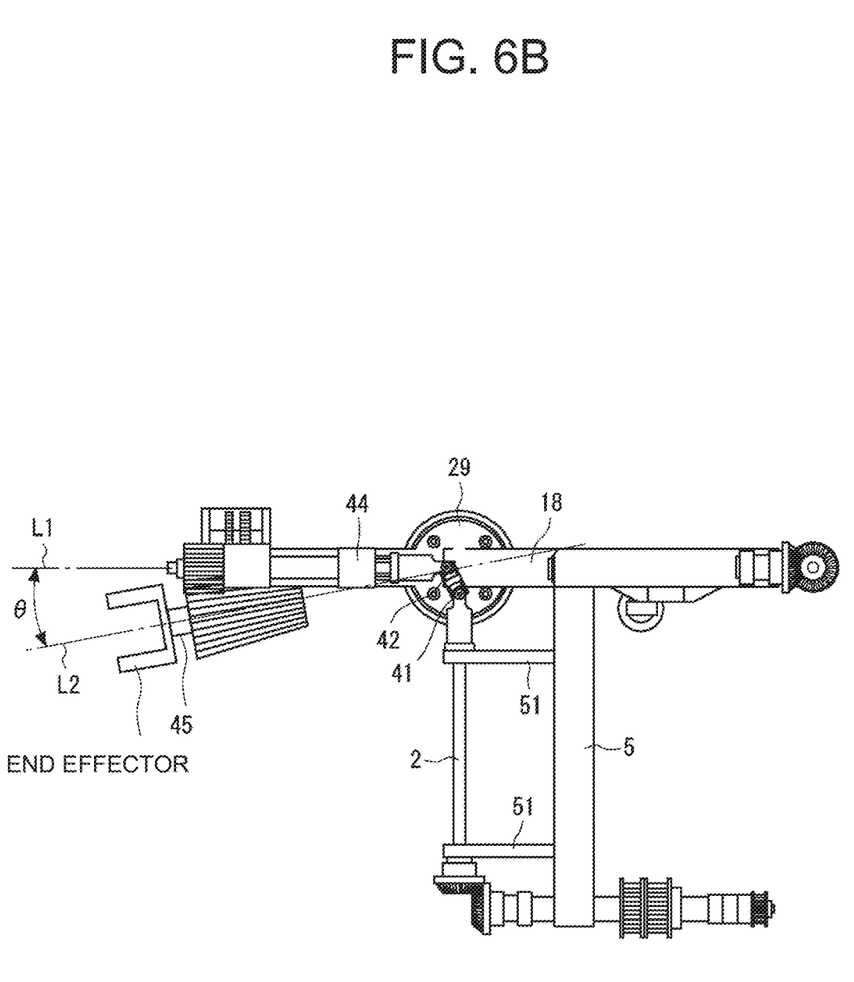
FIG. 6B shows a view showing a state where the wrist joint part according to the present embodiment is bending around the roll axis.

FIG. 6A and FIG. 6B are views showing a state where the wrist joint part according to the present embodiment is bending around the roll axis. FIG. 6A is a view showing a state of the bending angle of 0 deg on the center axis of the second universal joint. FIG. 6B is a view showing a state of the bending angle of 90 deg on the center axis of the second universal joint. Notably, in FIG. 6A and FIG. 6B, illustration of the gear configuration regarding the offset shaft 45 is simplified for ease of understanding.

For example, the center axis L1 of the second universal joint 42 takes the state of the bending angle of 90 deg shown in FIG. 6B from the state of the bending angle of 0 deg in FIG. 6A. In this stage, the center axis L2 of the offset shaft 45 has an offset of the predetermined angle θ in the bending direction of the wrist joint part 4 relative to the center axis L1 of the second universal joint 42. Accordingly, the offset shaft 45 takes a state of a bending angle shown in FIG. 6B (90 deg—predetermined angle θ) from a state of a bending angle shown in FIG. 6A (0 deg—predetermined angle θ).

Notably, as mentioned above, the offset shaft 45 has the configuration of rotating in the offset state of the predetermined angle θ in the bending direction of the wrist joint part 4 relative to the center axis line L1 of the second universal joint 42 using the first and second bevel gears 33, 34, the first and second spur gears 35, 36, and the like mentioned above, not being limited to this. For example, by coupling a rear end of the offset shaft 45 and an end part of the second universal joint 42 via two universal joints, the offset shaft 45 may take a configuration of rotating in the offset state of a predetermined angle in the bending direction of the wrist joint part 4 relative to the center axis L1 of the second universal joint 42. In this case, bending of the two universal joints is needed to be restricted with a mechanism to keep the predetermined angle.

In consideration of the design margins as mentioned above, the predetermined angle θ may be set to 10 deg, for example. Thereby, the movable range of the wrist joint part 4 can be changed to −100 deg to +80 deg from −90 deg to +90 deg, and a margin of 10 deg can be secured with respect to the movable range of −90 deg to +70 deg for the wrist joint of a person.

Figure 7A:
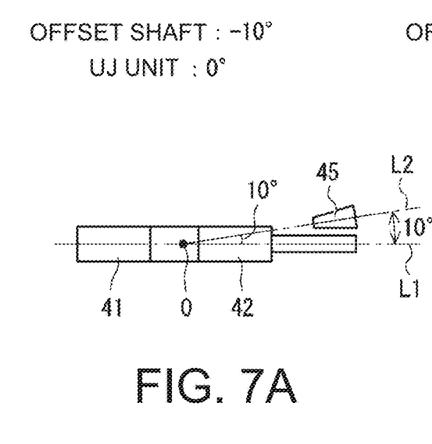
FIG. 7A shows a view of an angle of the offset shaft in accordance with an angle of the center axis of the second universal joint.
Figure 7B:
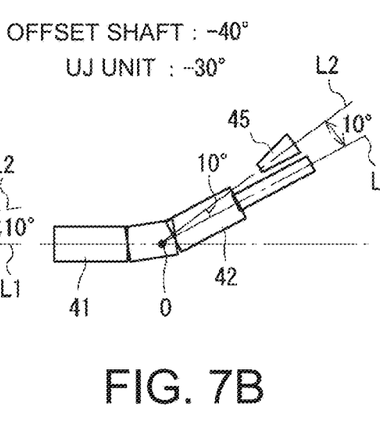
FIG. 7B shows a view of an angle of the offset shaft in accordance with an angle of the center axis of the second universal joint.
Figure 7C:
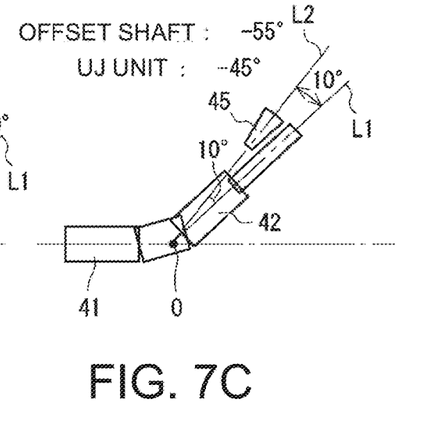
FIG. 7C shows a view of an angle of the offset shaft in accordance with an angle of the center axis of the second universal joint.
Figure 7D:
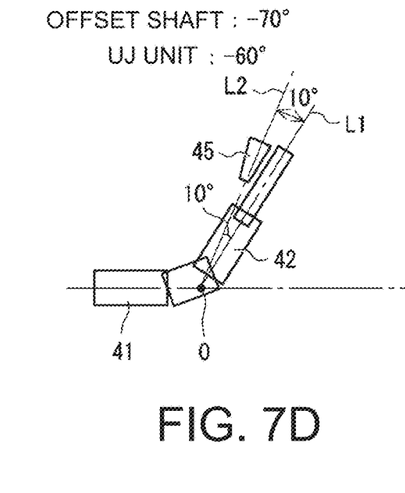
FIG. 7D shows a view of an angle of the offset shaft in accordance with an angle of the center axis of the second universal joint.
Figure 7E:
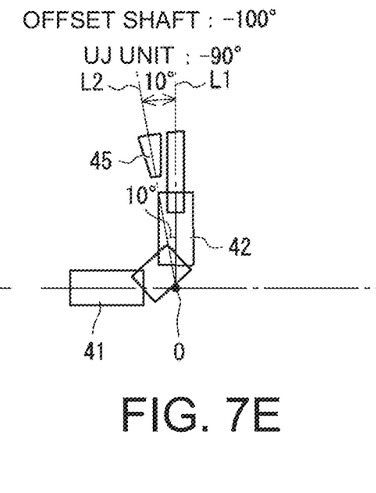
FIG. 7E shows a view of an angle of the offset shaft in accordance with an angle of the center axis of the second universal joint.
Figure 7F:
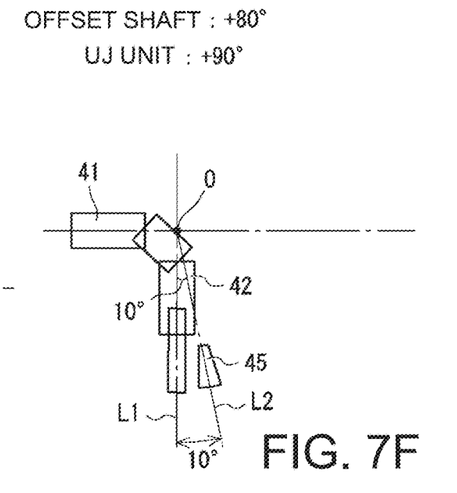
FIG. 7F shows a view of an angle of the offset shaft in accordance with an angle of the center axis of the second universal joint.

More specifically, as shown in FIG. 7A, when an angle of the center axis of the second universal joint 42 (hereinafter referred to as UJ unit) is 0°, the angle of the offset shaft 45 is −10°, as shown in FIG. 7B, when the angle of the UJ unit is −30°, the angle of the offset shaft 45 is −40°, as shown in FIG. 7C, when the angle of the UJ unit is −45°, the angle of the offset shaft 45 is −55°, as shown in FIG. 7D, when the angle of the UJ unit is −60°, the angle of the offset shaft 45 is −70°, as shown in FIG. 7E, when the angle of the UJ unit is −90°, the angle of the offset shaft 45 is −100°, and as shown in FIG. 7F, when the angle of the UJ unit is +90°, the angle of the offset shaft 45 is +80°.

While some embodiments of the present disclosure have been described, these embodiments are exemplary illustrations and are not intended to limit the scope of the disclosure. These novel embodiments may be implemented in other various modes, and various omissions, replacements, and alterations thereof may occur without departing from the spirit of the disclosure. These embodiments and their modifications are included within the disclosure disclosed in the claims and its equivalents.

What is claimed is:
1. A joint mechanism comprising:
a rotatable first rotary shaft arranged on a proximal side of the joint mechanism, the first rotary shaft being rotatable around a center axis line of the first rotary shaft that extends in a longitudinal direction of the first rotary shaft;
a rotatable second rotary shaft arranged on a distal side of the joint mechanism, the second rotary shaft being rotatable around a center axis line of the second rotary shaft that extends in a longitudinal direction of the second rotary shaft; and
a joint part that couples the first rotary shaft to the second rotary shaft, the joint part including a first coupling member and a second coupling member, the joint part transmitting rotation of the first rotary shaft from the first rotary shaft to the second rotary shaft, the joint part configured to enable the second rotary shaft to rotate relative to the first rotary shaft around a pitch axis and a roll axis while the first and second rotary shafts rotate around a yaw axis, the pitch axis, the yaw axis and the roll axis being perpendicular to each other, wherein:
the first coupling member and the second coupling member are connected to each other in series between the first rotary shaft and the second rotary shaft;
one of the first rotary shaft and the second rotary shaft includes a telescopic mechanism configured to extend and contract the one of the first rotary shaft and the second rotary shaft;
the first and second coupling members are arranged such that an intersection of the center axis line of the first rotary shaft and the center axis line of the second rotary shaft coincides with an intersection of the pitch axis, the yaw axis, and the roll axis;
a distal end of the second rotary shaft is rotatably coupled by gears to an offset shaft that is offset relative to the center axis line of the second rotary shaft by a predetermined fixed angle in a bending direction of the joint part, the rotation of the second rotary shaft being transmitted to the offset shaft by the gears to cause the offset shaft to rotate; and
a center axis of the offset shaft passes through a bending center of the first and second coupling members.

2. The joint mechanism according to claim 1, wherein the first and second coupling members are arranged such that, when each of the first and second coupling members takes any bending angle within a movable range, the intersection of the center axis line of the first rotary shaft and the center axis line of the second rotary shaft coincides with the intersection of the pitch axis, the yaw axis, and the roll axis.

3. The joint mechanism according to claim 1, wherein the first rotary shaft includes the telescopic mechanism.

4. The joint mechanism according to claim 1, wherein
the gears that couple the distal end of the second rotary shaft to the offset shaft include
a first bevel gear coupled to the distal end of the second rotary shaft, and
a second bevel gear that engages with the first bevel gear and transmits rotation of the second rotary shaft to the offset shaft,
the joint mechanism further comprises a holding member that rotatably holds the first and second bevel gears, and the offset shaft is rotatably held by the holding member.

5. The joint mechanism according to claim 1, wherein the first coupling member is a first universal joint and second coupling member is a second universal joint attached to the first universal joint.

6. The joint mechanism according to claim 1, wherein:
the joint part is a wrist joint part; and
the predetermined fixed angle is 10 deg.

7. A joint mechanism comprising:
a rotatable first rotary shaft arranged on a proximal side of the joint mechanism, the first rotary shaft being rotatable around a center axis line of the first rotary shaft that extends in a longitudinal direction of the first rotary shaft;
a rotatable second rotary shaft arranged on a distal side of the joint mechanism, the second rotary shaft being rotatable around a center axis line of the second rotary shaft that extends in a longitudinal direction of the second rotary shaft; and
a joint part that couples the first rotary shaft to the second rotary shaft, the joint part including a first coupling member and a second coupling member, the joint part transmitting rotation of the first rotary shaft from the first rotary shaft to the second rotary shaft, the joint part configured to enable the second rotary shaft to rotate relative to the first rotary shaft around a pitch axis and a roll axis while the first and second rotary shafts rotate around a yaw axis, the pitch axis, the yaw axis and the roll axis being perpendicular to each other, wherein:
the first coupling member is a first universal joint, and the second coupling member is a second universal joint that is different from the first universal joint;
the first universal joint and the second universal joint are connected to each other in series between the first rotary shaft and the second rotary shaft;
one of the first rotary shaft and the second rotary shaft includes a telescopic mechanism configured to extend and contract the one of the first rotary shaft and the second rotary shaft; and
the first and second universal joints are arranged such that an intersection of the center axis line of the first rotary shaft and the center axis line of the second rotary shaft coincides with an intersection of the pitch axis, the yaw axis, and the roll axis.

8. The joint mechanism according to claim 7, wherein the first and second universal joints are arranged such that, when each of the first and second universal joints takes any bending angle within a movable range, the intersection of the center axis line of the first rotary shaft and the center axis line of the second rotary shaft coincides with the intersection of the pitch axis, the yaw axis, and the roll axis.

9. The joint mechanism according to claim 7, wherein the first rotary shaft includes the telescopic mechanism.

* * * * *